United States Patent [19]

Morris et al.

[11] Patent Number: 5,123,703
[45] Date of Patent: Jun. 23, 1992

[54] ADJUSTABLE SEAT RECLINER APPARATUS HAVING ANGLED RIVOT SECUREMENT

[75] Inventors: Kirk E. Morris, Davisburg, Mich.; Andrew J. Stribling, St. Thomas Elgin, Canada

[73] Assignee: ITT Corporation, New York, N.Y.

[21] Appl. No.: 658,136

[22] Filed: Feb. 20, 1991

[51] Int. Cl.⁵ .............................................. B60N 2/02
[52] U.S. Cl. .................................... 297/362; 29/524.1
[58] Field of Search ............... 297/361, 362, 366, 373; 201/524.1, 525.2, 243.53; 411/23, 501–507; 403/87, 61, 408.1, 274, 279, 280, 281, 282

[56] References Cited

U.S. PATENT DOCUMENTS

| | | |
|---|---|---|
| Re. 32,884 | 3/1989 | Kluting et al. |
| 355,274 | 12/1886 | Manls et al. ........................ 29/525.2 |
| 3,788,698 | 1/1974 | Perkins . |
| 3,840,268 | 10/1974 | Johndrow et al. |
| 4,146,118 | 3/1979 | Zankl .............................. 411/501 X |
| 4,335,496 | 6/1982 | Kanamura et al. ............. 403/274 X |
| 4,591,207 | 5/1986 | Nithammer et al. . |
| 4,659,146 | 4/1987 | Janiaud . |
| 4,709,965 | 12/1987 | Kazaoka et al. . |
| 4,781,415 | 11/1988 | Heesch et al. . |
| 4,801,177 | 1/1989 | Kanazawa . |
| 4,872,726 | 10/1989 | White et al. . |
| 4,875,735 | 10/1989 | Moyer et al. . |
| 4,884,845 | 12/1989 | Schmale et al. . |
| 4,913,494 | 4/1990 | Ikegaya ............................. 297/367 |
| 4,946,223 | 8/1990 | Croft et al. ...................... 297/362 X |
| 4,962,963 | 10/1990 | Robinson ....................... 297/362 X |
| 4,999,896 | 3/1991 | Mengus et al. ................ 29/524.1 X |
| 5,005,906 | 4/1991 | Suzuki et al. .................... 74/409 X |
| 5,026,234 | 6/1991 | Luhm .................................. 411/507 |

Primary Examiner—James R. Brittain
Assistant Examiner—James M. Gardner
Attorney, Agent, or Firm—Robert P. Seitter; J. Gordon Lewis

[57] ABSTRACT

An arm connectible to a seat back and having teeth formed at one end is pivotally mounted to a seat bottom frame formed of first and second spaced, fixedly connected plates. A toothed drive gear mounted between the first and second plates and rotated by a drive unit meshingly engages the teeth on the arm to rotate the arm between infinitely adjustable positions. Aligned slots are formed in the first and second plates and receive opposed tenons of a rivet having the arm rotatably mounted about a central body portion. The tenons are angularly staked to the first and second plates such that one edge of each tenon farthest from the teeth on the arm is disposed in registry with the associated plate adjacent one edge of the slot and the diametrically opposed edge of each tenon is spaced above the opposite end of the slot in each plate to dispose the exterior end surface of each tenon at an acute angle with respect to the associated plate to urge the rivet and the arm in a direction toward the drive member to interlock the teeth on the arm with the teeth on the drive member.

10 Claims, 3 Drawing Sheets

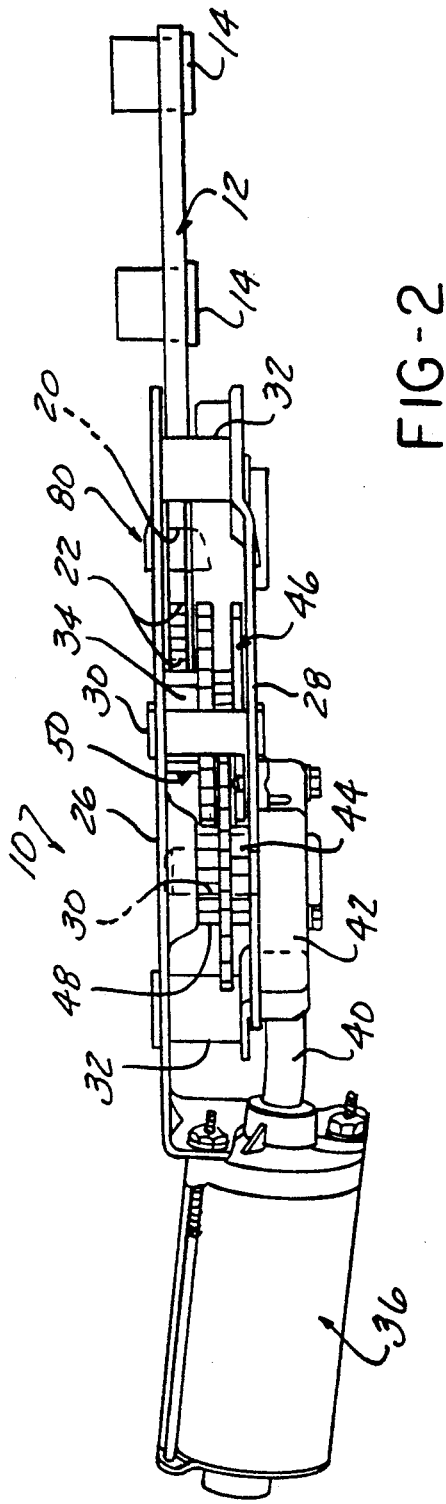
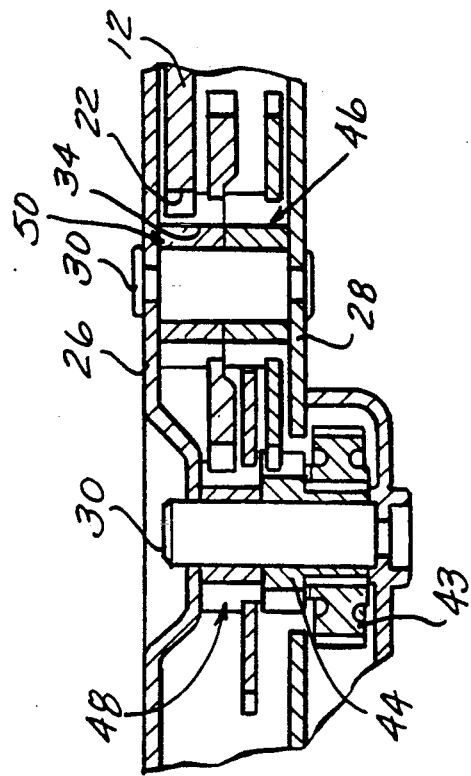
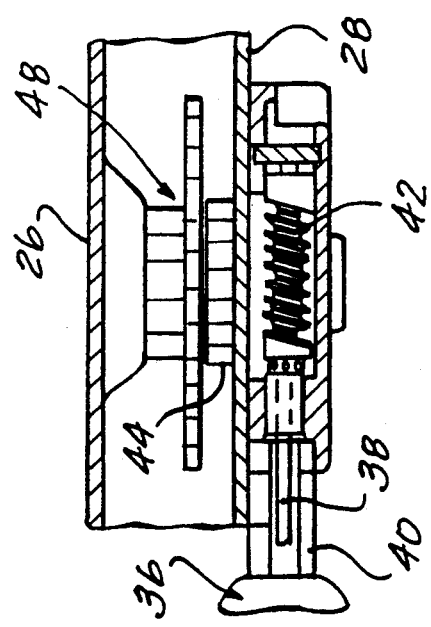
FIG-2
FIG-5
FIG-4

ADJUSTABLE SEAT RECLINER APPARATUS HAVING ANGLED RIVOT SECUREMENT

BACKGROUND OF THE INVENTION

1. Field of the Invention

The present invention relates, in general, to vehicle recliner seats and, more specifically, to apparatus for adjustably controlling the position of pivotal components of a vehicle recliner seat.

2. State of the Art

Seats, particularly those employed in vehicles such as automobiles, trucks, etc., are typically constructed with a variety of adjustments, i.e., fore, aft, vertical and/or tilt. In these adjustments, the seat back and seat bottom members of the seat move as a unit. It is also known to provide an adjustment of the seat back member relative to the seat bottom member of a seat. Such an adjustment provides a wide degree of movement of the seat back between a substantially upright position to a more horizontal position such that seats having this type of adjustment are generally referred to as recliner seats.

Such recliner seats include a seat back member which is pivotally connected to the seat bottom frame by a hinge or pivot. A rivet is commonly used to rotatably mount the pivotal seat back member to the surrounding seat bottom frame members. The rivet extends through aligned circular apertures in the seat bottom frame members and the seat back member to rotatably mount the seat back member to the seat bottom frame.

A sector gear is formed at a lower end of the seat back member and engages a drive gear mounted in the seat bottom frame for pivotal movement of the seat back member between a plurality of infinitely selectible positions upon rotation of the drive gear. Another common reclining seat construction utilizes a pawl which releasably engages a tooth in the sector gear to lock the sector gear and the attached seat back in a selected angular position with respect to the seat bottom. A latch release and lock mechanism is coupled to the pawl to selectively disengage the pawl from the sector gear to allow pivotal movement of the seat back relative to the seat bottom and to lockingly engage the pawl with the sector gear to fix the seat back in a selected angular position relative to the seat bottom.

In all of these conventional recliner seat constructions, there exists gear tolerance or slack between the sector gear and the pawl or drive gear. Such gear tolerance results in a slight movement of the seat back with respect to the seat bottom even when the seat back and seat bottom are in a locked position. This movement leads to vibration and noise during operation of the vehicle and an undesirable looseness in the seat which directly affects the quality of the seat. Various mechanisms have been devised to eliminate or reduce such gear tolerance. Such devices use resilient or biasing members to constantly urge the sector gear or pawl into a tight engagement with the opposite member. However, such additional members add to the complexity and cost of the recliner seat.

Thus, it would be desirable to provide a recliner seat apparatus which substantially reduces gear tolerance in the seat between a sector gear and a drive or lock member. It would also be desirable to provide a recliner seat apparatus in which gear tolerance is easily and inexpensively reduced or minimized. Finally, it would be desirable to provide a recliner seat apparatus with substantially reduced gear tolerance which does not require significant modification of the seat or the use of additional components.

SUMMARY OF THE INVENTION

The present invention is an adjustable seat recliner apparatus and method of making the same. The present seat recliner apparatus includes an arm connectible to a seat back. The arm has first and second ends and an aperture located therebetween. A plurality of teeth are formed at the second end of the arm.

First and second spaced plates forming a seat bottom frame are fixedly connected together and connectible as a unit to a seat bottom. Aligned slots are formed in the first and second plates. A drive member is rotatably mounted to at least one of the first and second plates and has peripheral mounted teeth which meshingly engage the teeth on the arm. A drive means is also mounted to at least one of the first and second plates for rotating the drive member.

A rivet having a central body and first and second, opposed, outwardly extending tenons is disposed in the aperture in the arm such that the arm is rotatably mounted thereabout. The first and second tenons are staked to the first and second plates, respectively. The first tenon is staked such that one edge thereof located farthest from the teeth on the arm is disposed in registry with the first plate and the diametrically opposed edge of the first tenon is spaced above the first plate such that the end surface of the first tenon between the two edges is disposed at an acute angle with respect to the first plate and the rivet and the arm rotatably mounted thereon are urged by the angularly staked rivet in a direction toward the drive member to reduce gear tolerance between the arm and the drive member.

In a preferred embodiment, both of the first and second tenons are angularly staked such that the end surfaces thereof are disposed at acute angles with respect to the adjacent first and second plates to evenly urge the arm toward the drive member. Preferably, the acute angle between the end surface of one or both of the first and second tenons is between substantially 3° and 25°.

The method of the present invention includes the steps of:

forming a slot in a first plate connectible to a seat bottom, mounting a first tenon of a rivet having a central body with a circular cross section and opposed first and second tenons in the slot in the first plate, with the first tenon extending through the slot, forming an aperture between opposed ends of an arm having teeth formed at one end which are meshingly engageable with the teeth of a drive member, rotatably mounting the aperture in the arm over the central body of the rivet, with the second tenon extending through the aperture in the arm, forming a slot in a second plate, mounting the slot in the second plate over the second tenon of the rivet, with the second tenon extending outward through the slot in the second plate, fixedly connecting the second plate to the first plate, and angularly staking at least one of the first and second tenons to the associated first and second plate.

Preferably, the step of angularly staking one of the tenons comprises the steps of staking the first tenon to the first plate by urging a first edge of the first tenon into registry with the first plate and a portion of the first tenon adjacent the first edge into registry with the interior edge of the slot and urging a second, diametrically opposed edge of the first tenon into contact with the first plate such that the second edge is spaced above the first plate and the end surface of the first tenon between the first and second edges is disposed at an acute angle with respect to the first plate.

In a preferred embodiment, both of the first and second tenons are staked at the described angular orientation with respect to the associated first and second plates. Preferably, the first and/or second tenon is staked such that the resulting angle of the end surface of each of the first and/or second tenon is between substantially 3° and 25° with respect to the associated first or second plate.

The seat recliner apparatus and method of constructing the same of the present invention uniquely urges the sector gear formed at one end of a seat back member into tight meshing engagement with the drive member mounted in the seat bottom to take up any gear tolerance therebetween. This eliminates vibration and noise resulting from such gear tolerance or looseness prevalent in prior art seat recliners. The force applied to the sector gear by the angular staking of the rivet is also transmitted through the remainder of the drive gear assembly to reduce any gear tolerance therein.

The apparatus and method of the present invention is easily achieved using conventional staking equipment and without significant modification to conventional seat recliner construction.

BRIEF DESCRIPTION OF THE DRAWING

The various features, advantages and other uses of the present invention will become more apparent by referring to the following detailed description and drawing in which:

FIG. 2 is a bottom view of the seat recliner apparatus shown in FIG. 1;

FIG. 4 is a cross sectional view generally taken along line 4—4 in FIG. 1;

FIG. 5 is a cross sectional view generally taken along line 5—5 in FIG. 1;

DESCRIPTION OF THE PREFERRED EMBODIMENTS

Figure 1:
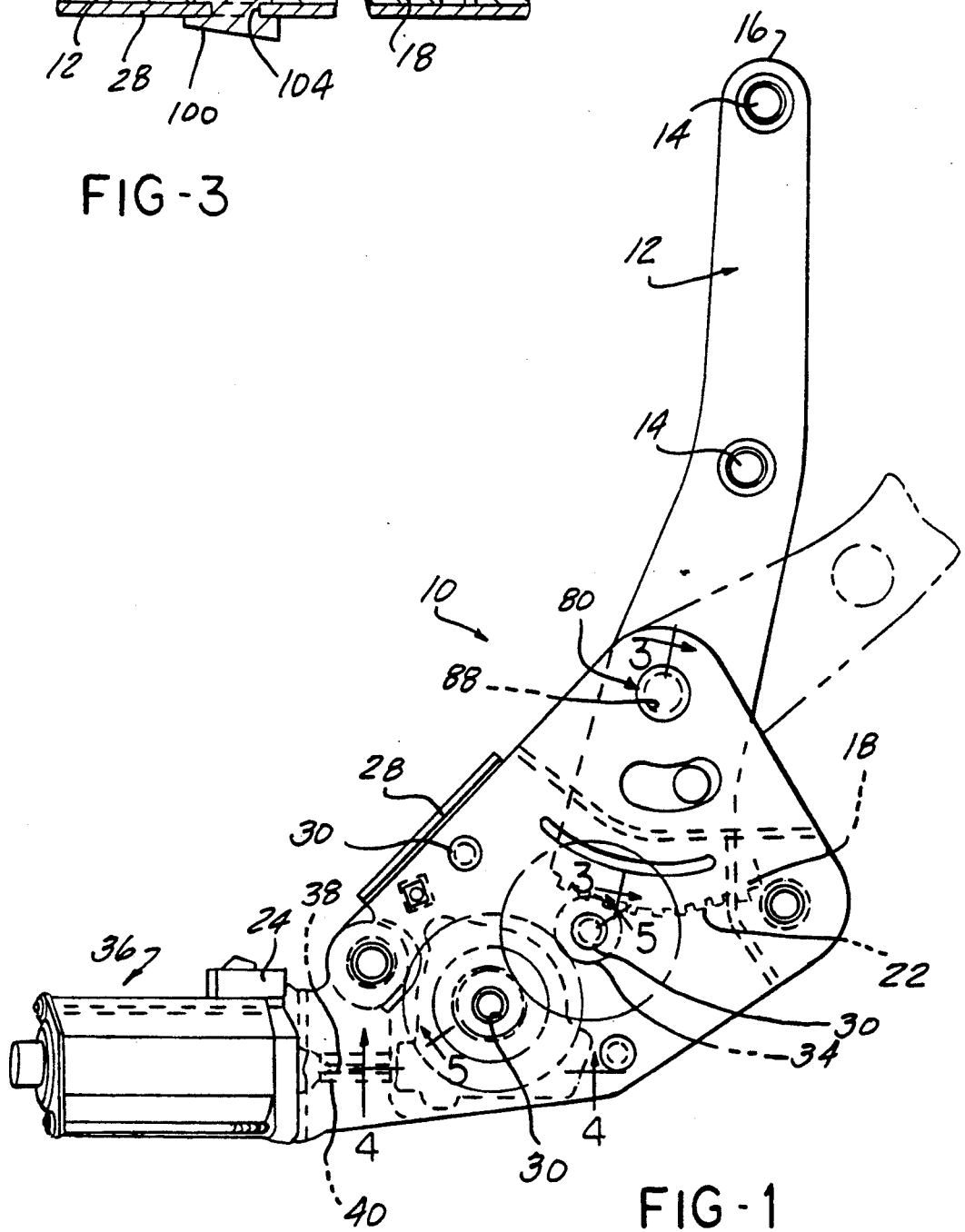
FIG. 1 is a side elevational view of a seat recliner apparatus constructed in accordance with the teachings of the present invention.

Referring now to the drawing, and to FIGS. 1 and 2 in particular, there is illustrated a seat recliner apparatus 10 for use on a seat, particularly, a seat used in vehicles, such as automobiles, trucks, etc. As is well known, and not shown for reasons of clarity, such seats include a seat cushion or bottom and a seat back which is hingedly connected to the seat bottom by means of hinge members along the inboard and outboard ends of the seat back. The subject seat recliner apparatus 10, as shown in FIGS. 1 and 2 is mounted on one side of the seat and includes a seat back member or arm 12 in the form of an elongated, planar strip. The arm 12 is adapted to be connected to the seat back of the seat by means of suitable fasteners, such as spacer bolts 14, which extend through the arm 12 into the seat back.

The arm 12 has a first end 16 and a second, opposed end 18. An aperture 20 having a circular cross section is formed in the arm 12 between the first and second ends 16 and 18. Further, the second end 18 of the arm 12 has an arcuate shape with a plurality of spaced, teeth 22 forming a sector gear at the second end 18.

The arm 12 is pivotally connected to a seat bottom frame assembly for pivotal movement between a substantially upright position shown by solid lines in FIG. to a plurality of infinitely adjustable positions denoted generally by the phantom lines in FIG. 1.

The seat bottom frame assembly includes a first inner plate 26 and a spaced, second outer plate 28. The first and second plates 26 and 28 are fixedly connected together by means of suitable fasteners, such as single or double ended rivets 30. The rivets 30 are staked to the first and second plates 26 and 28 by means of suitable staking equipment, such as an orbital staking machine. In addition, spacer bolts 32 extend through the first and second plates 26 and 28 into the seat bottom to connect the seat bottom frame assembly to the seat bottom of a seat.

As is conventional, the seat recliner 10 of the present invention includes means for pivotally driving the arm 12 between a plurality of infinitely adjustable positions. The driving means includes a drive member 34, such as a gear having a plurality of teeth, which meshingly engage the teeth 22 formed at the second end 18 of the arm 12. The driving means also includes a bidirectional electric motor 36 having a rotatable output shaft 38. A protective sheath 40 covers the shaft 38 as shown in FIGS. 1, 2 and 4. The electric motor 36 may be of either the A.C. or D.C. type and is selectively connected to a source of electric power by means of a two-position switch, not shown, which is connected or plugged-in to the motor 36 via a connector 24 shown in FIG. 1.

A worm 42 is coupled to and driven by the output shaft 38 of the motor 36. The worm 42 engages a worm gear 43 which is fixedly mounted about a pinion 44 rotatably mounted about a rivet 30 extending between the first and second plates 26 and 28, as shown in detail in FIGS. 2 and 5. The pinion 44 is operably coupled to a gear reduction unit formed of a plurality of double gear sets 46, 48 and 50 rotatably mounted on rivets 30. The gear reduction unit reduces the speed of rotation of the output shaft 38 of the motor 36 to a lower speed of revolution of the drive member or gear 34.

As shown in FIGS. 2 and 5, by way of example only, the pinion 44 drives one gear of the first double gear set 46. The other gear of the first gear set 46 meshingly engages one of the gears of the second gear set 48. The other of the second gear set 48 engages one of the gears of the third gear set 50. The other gear 34 of the third gear set 50 is the drive gear 34 which meshingly engages the teeth 22 on the second end 18 of the seat back member or arm 12. Further, as shown in FIGS. 1, 2 and 5, the rivets 30 extending between the first and second plates 26 and 28 rotatingly receive the pinion 44 and the first, second and third double gear sets 46, 48 and 50, respectively.

In operation, energization of the motor 36 will cause the output shaft 38 to rotate in one direction. This rotation is converted by the worm 42, the worm gear 43, the pinion 44, the gear reduction unit formed of the first, second and third gear sets 46, 48 and 50 and the gear teeth 22 at the end of the arm 12 to a pivotal rotation of the arm 12 in the one direction, such as clockwise, to any position between that shown in solid lines and that shown in phantom lines in FIG. 1. The motor 36 may be deenergized at any time as desired by a user. When the motor 36 is de-energized, the worm 42, the worm gear 43 and the pinion 44 form a positive lock which fixingly positions the seat back arm 12 in the desired angular position with respect to the seat bottom frame assembly.

Electric current of opposite polarity applied to the motor 36 will cause the output shaft 38 and the worm 42 and worm gear 43 to rotate in an opposite direction. Through the pinion 44 and the gear reduction means, this rotation will cause the seat back arm 12 to pivot in a counterclockwise position to a more upright position, such as that shown in solid in FIG. 1.

It will be understood that the above-described and illustrated description of a gear drive means is by way of example only as the teachings of the present invention, as described hereafter, may be employed with other types of seat recliner drive apparatus, such as a manually operated latchable pawl or a spring operated, gear and clutch arrangement.

Figure 6:
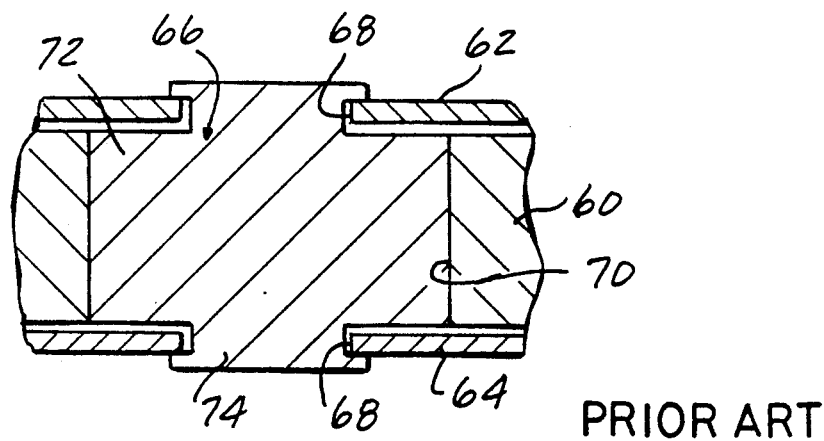
FIG. 6 is an enlarged, partial, cross sectional view showing a prior art seat back to seat bottom rivet construction.

In order to more clearly understand the teachings of the present invention, references is made to FIG. 6 which depicts a typical prior art method of pivotally connecting a seat back arm 60 having a sector gear, not shown, formed at one end to a seat bottom frame assembly formed of an inner plate 62 and an outer plate 64, respectively. A double-ended rivet denoted generally by reference number 66 is disposed between aligned, substantially circular apertures 68 formed in the inner and outer plates 62 and 64 and a circular aperture 70 formed in the seat back arm 60. The rivet 66 has a central body 72 with a substantially circular cross section which is complimentary to the circular cross section of the aperture 70 formed in the seat back arm 60 such that the seat back arm 60 is free to rotate thereabout under driving connection with a drive means, such as the drive gear 34 described above. The rivet 66 also includes opposed, outwardly extending tenons 74 and 76 which initially have a cross section slightly smaller than the cross section of the aligned apertures 68 formed in the inner and outer plates 62 and 64. The tenons 74 and 76 are staked to the inner and outer plates 62 and 64 utilizing conventional staking equipment to form a mechanical connection between the rivet 66 and the inner and outer plates 62 and 64. In this manner, the seat back arm 60 is rotatably mounted to the seat bottom frame formed of the inner and outer plates 62 and 64, respectively.

However, according to this conventional staking technique, the rivet 66 is located substantially centrally within the apertures 68 in the inner and outer plates 62 and 64 to fixedly position the seat back arm 60 with respect to the inner and outer plates 62 and 64. Any tolerance between the gear teeth at the end of the seat back arm 60 and the teeth of the interconnected gear drive member remains thereby resulting in possible looseness which can cause vibration and noise due to movement of the seat back with respect to the seat bottom.

Figure 3:
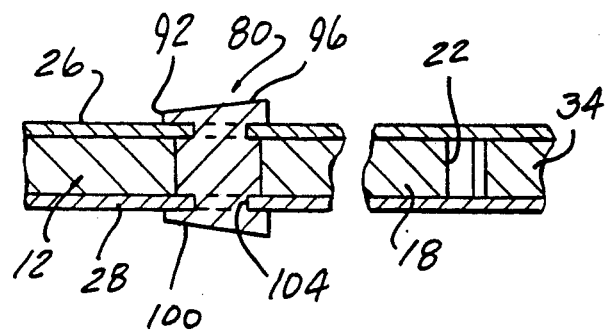
FIG. 3 is a cross sectional view generally taken along line 3—3 in FIG. 1.

The present invention eliminates or substantially minimizes such looseness or gear tolerance by forcibly urging the seat back arm in a direction toward the drive member. As shown in FIG. 3, and in greater detail in FIGS. 7 and 8, a hinge pin, such as a rivet 80, is interposed between the first, inner plate 26 and the second, outer plate 28. The rivet 80 is a conventional double-ended rivet having a circular central body 82 and opposed, outwardly extending first and second tenons 84 and 86, respectively.

According to the present invention, the aperture 88 formed in each of the first and second plates 26 and 28 is elongated from the conventional circular aperture shown in FIG. 6 to form an elongated slot having a length larger than the diameter of the first and second tenons 84 and 86 of the rivet 80. However, the shape of the aperture 90 in the arm 12 is circular to remain complimentary to the shape of the central body 82 of the rivet 80.

Figure 8:
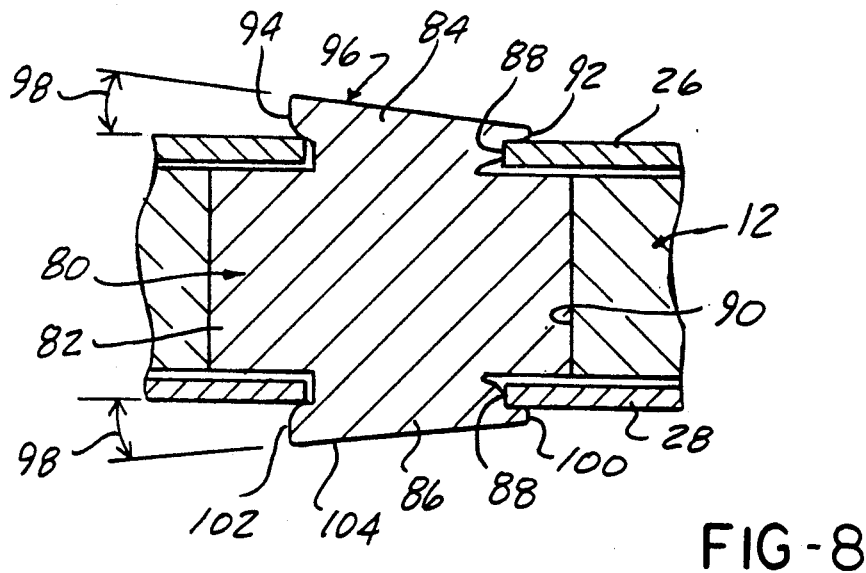
FIG. 8 is an enlarged, partial, cross sectional view showing the angular staking steps of the method of constructing a seat recliner apparatus according to the present invention.

In order to securely attach the rivet 80 to the first and second plates 26 and 28 and to thereby rotatably mount the arm 12 between the first and second plates 26 and 28, a conventional riveting or staking operation, preferably using an orbital staking machine, is employed. Using this construction method, a first edge 92, shown in FIG. 8, of the first tenon 84 farthest from the teeth 22 on the arm 12 is forcibly urged into registry with the first plate 26 thereby securely connecting one side of the rivet 80 to the first plate 26. The seat back assembly containing the interconnected first and second plates 26 and 28 is mounted at a predetermined angle from horizontal in the staking machine which causes a diametrically opposed portion of the first tenon 86 to be staked or mechanically coupled to the first plate 26 in such a manner that a second edge 94 on the first tenon 84 is spaced above the outer surface of the first plate 26 as shown in FIG. 8. This causes the exterior surface 96 of the second tenon 86 to be disposed at an acute angle shown by reference number 98 with respect to the second plate 28. Preferably, the angle 98 is between substantially 3° and 25°. This angular staking of the first tenon 84 in combination with the slot 88 causes one side of the tenon 84 to be deformed into the slot 88 as shown in FIG. 8 which, in turn, forcibly urges the rivet 80 and the arm 12 rotatably mounted thereon to the opposite end of the slot 88 in a direction to the left in FIG. 8 and toward the drive gear 34 to which the teeth 22 on the arm 12 are meshingly interconnected. This eliminates or substantially reduces any gear tolerance between the teeth 22 on the arm 12 and the teeth on the drive gear 34 and results in a fixed, mechanically secure connection between the arm 12 and the drive gear 34.

The opposed second tenon 86 may be staked to the second plate 28 in a conventional manner, such as that shown in FIG. 6 and described above. However, it is preferred that the second tenon 86 be staked to the second plate 28 at the same angular orientation as the first tenon 84. Thus, a first edge 100 of the second tenon 86 farthest from the teeth 22 on the arm 12 mounted about the rivet 80 is urged into registry with the second plate 28 adjacent one edge of the slot 88 in the second plate 28. The diametrically-opposed second edge 102 of the second tenon 86, when staked, is spaced above the second plate 28 to cause the exterior surface 104 of the second tenon 86 to be disposed at an acute angle 98 with respect to the second plate 28. This angle, as noted above, is preferably the same as the angle 98 for the first tenon 84.

The degree of angular staking is selected to meet the requirements of a particular application. Degrees of angular staking significantly greater than the specified range may be ineffective in moving the arm any greater distance toward the drive member as the arm will encounter resistance as it is urged into contact with the drive member. Further, the fit between the arm and the drive member must be such as to enable rotation of the arm and drive member without excessive torque or force requirements.

According to the present invention, a method for constructing a recliner apparatus for a seat having a seat bottom, a seat back and a drive means having a toothed drive member includes the steps of forming a slot 88 in a first plate 26 connectible to the seat bottom. Next, a first tenon 84 of a rivet 80 having a central body 82 with a circular cross section and opposed first and second tenons 84 and 86 is inserted in the slot 88, with the first tenon 84 extending outward through the slot 88 in the first plate 26.

Figure 7:
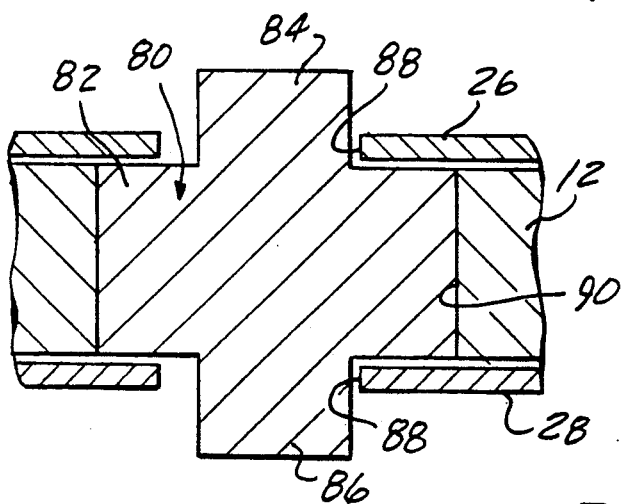
FIG. 7 is an enlarged, partial, cross sectional view showing the initial steps of the method of constructing a seat recliner according to the present invention.

An aperture 90 is formed in an arm 12 having teeth 22 at one end which are meshingly engageable with the teeth of a drive member 34. The aperture 90 is rotatably mounted about the central body 82 of the rivet 80 with the second tenon 86 of the rivet 80 extending outward from one side of the arm 12 as shown in FIG. 7.

A slot 88 is formed in a second plate 28 and aligned with the slot 88 in the first plate 26. The slot 88 in the second plate 28 is mounted over the second tenon 86 of the rivet 80, with the second tenon 86 extending outward beyond the exterior surface of the second plate 28. The second plate 28 is then fixedly connected to the first plate 26 by suitable fasteners, such as rivets 30 shown in FIGS. 1 and 2.

Next, at least one of the first and second tenons 84 and 86, such as the first tenon 84, are angularly staked to the associated first and second plates 26 and 28, respectively. According to the method of the present invention, one edge 92 of the first tenon 84 is staked into registry with the first plate 26 adjacent one edge of the slot 88 in the first plate 28 and a portion of the first tenon 84 adjacent the first edge 92 is forced into registry with the interior edge of the slot 88. This mechanically urges or forces the rivet 80 and the rotatably mounted arm 12 toward the drive gear 34 to reduce or minimize gear tolerance between the teeth 22 on the arm 12 and the teeth on the drive gear 34. The first and second plates 26 and 28 are angularly disposed in the staking machine such that the second diametrically opposed edge 94 of the first tenon 84 is staked to the first plate 26 adjacent the opposed edge of the slot 88 after the opposite side of the tenon 84 has been deformed by the staking into the slot 88. This causes the second edge 94 to be spaced above the second plate 28 such that the exterior surface 96 of the first tenon 84 is disposed at an acute angle 98, preferably between 3° and 25°, with respect to the first plate 26.

The second tenon 86 is preferably likewise angularly staked to the second plate 28 such that the exterior surface 104 of the second tenon 86 is disposed at the same acute angle 98 with respect to the second plate 28.

The angular staking of the rivet 80 may be employed in a wide variety of seat recliner constructions besides the gear drive construction described above. For example, the arm with angularly staked rivets may be employed in manual operated seat recliners using a releasable latch and pawl which releasably engages the teeth on the arm or a seat recliner with manually released, spring biased gear and clutch drive means.

In summary, there has been disclosed a unique seat recliner apparatus and method of constructing the same which reduces gear tolerance between gear teeth formed on a seat back arm and a drive means or gear mounted in a seat bottom frame assembly. This eliminates gear tolerance or looseness between the gears which has resulted in vibration and noise in previously devised seat recliners. The apparatus and method of the present invention are easily employed utilizing conventional staking apparatus and without requiring significant modification to existing seat recliner assemblies. Specifically, the only alteration to existing seat recliner assemblies is the formation of a slot rather than a circular aperture for receiving the hinge rivet located between the seat back arm and the seat bottom frame members. The seat recliner is angularly disposed in a conventional staking machine to cause the tenons of the rivet to be staked at an angular orientation with respect to the seat bottom plates which uniquely urges the seat back arm into tight meshing engagement with drive gear.

What is claimed is:

1. A seat recliner apparatus for adjusting the relative inclination of two elements comprising:
a first member having first and second ends;
a second member having a slot formed therein; and
pivot means for connecting the first member to the second member through the slot in the second member and for allowing adjustable inclination of the first member relative to the second member, the pivot means including a rivot having at least one tenon extending outward therefrom for staking to the second member, such that one edge of the tenon, farthest from the first end of the first member, is disposed in registry with the second member and a diametrically opposed edge of the tension is spaced above the second member such that an end surface of the tenon between the first and diametrically opposed edges is disposed at an acute angle with respect to the second member to urge the rivot and connected first member in a predetermined direction.

2. The apparatus of claim 1 wherein the angle between the end surface of the at least one tenon and the second member is between substantially 3° and 25°.

3. The apparatus of claim 1 further comprising:
said first member having teeth connected to the first end thereof; and
drive means operably engaging the teeth connected to the first end of the first member for driving the first member in selective movement relative to the second member through a predetermined arc, wherein said rivot and connected first member are urged toward the drive means.

4. The apparatus of claim 3 wherein the drive means comprises:
a drive member rotatably mounted to the second member having teeth meshing with the teeth connected to the first member;
a bi-directional electrical motor having a rotatable output shaft; and
gear reduction means operably coupled between the output shaft of the motor and the drive member for bi-directionally rotating the drive member.

5. A seat recliner apparatus for adjusting the relative inclination of two elements, and in particular a back of a seat relative to a base of the seat, the apparatus comprising:

a base member having teeth formed on one end thereof;

a back member having a slot formed therein;

drive means for meshing engagement with the teeth formed on the back member for driving the back member in selective movement relative to the base member through a predetermined arc; and pivot means for connecting the base member to the back member and for allowing adjustable inclination of the back member relative to the base member, the pivot means including a rivot having at least one outwardly extending tenon formed thereon and a central body, the back member being rotatably disposed on the central body of the rivot and the tenon passing through the slot formed in the base member, the tenon being staked to the base member, such that one edge of the tenon, furthest from the teeth formed on the back member, is disposed n registry with the base member and a diametrically opposed edge of the tenon is spaced above the base member, such that an end surface of the tenon between the first and diametrically opposed edges is disposed at an acute angel with respect to the base member to urge the rivot and the back member rotatably mounted thereon in a direction toward the drive means, the angle between the end surface of the tenon and the base member being substantially between 3° and 25°.

6. A seat recliner apparatus for a seat having a seat bottom and a seat back comprising:

an arm connectible to a seat back, the arm having first and second ends and an aperture located between the first and second ends, teeth formed on the second end of the arm;

first and second spaced plates fixedly connected together and connectible to a seat bottom, first and second aligned slots formed in the first and second plates, respectively;

a drive member rotatably mounted to at least one of the first and second plates and having teeth meshing with the teeth on the arm;

drive means mounted to at least one of the first and second plates for rotating the drive member;

a rivet having a central body and first and second opposed tenons extending outward therefrom, the central body of the rivet being disposed in the aperture in the arm such that the arm is rotatable thereabout; and the first and second tenons being staked to the first and second plates, respectively, such that at least one of the first and second tenons has one edge farthest from the teeth on the arm disposed in registry with the associated first and second plates and a diametrically opposed edge of the one tenon is spaced above the associated plate such that the end surface of the one tenon between the first and the diametrically opposed edges is disposed at an acute angle with respect to the associated plate to urge the rivet and the arm rotatably mounted thereon in a direction toward the drive member.

7. The apparatus of claim 6 wherein both of the first and second tenons are staked to the associated first and second plates such that a first edge of each tenon farthest from the teeth on the arm is in registry with the associated plate and the diametrically opposed edge of each tenon is spaced above the associated plate such that the end surface of each tenon between the first and diametrically opposed edges is disposed at an acute angle with respect to the associated plate.

8. The apparatus of claim 6 wherein the angle between the end surface of the at least one of the first and second tenons and the associated plate is between substantially 3° and 25°.

9. The apparatus of claim 7 wherein the angle between the end surface of each tenon and each associated plate is between substantially 3° and 25°.

10. The apparatus of claim 6 wherein the drive means comprises:

a bidirectional electrical motor having a rotatable output shaft; and gear reduction means operably coupled between the output shaft of the motor and the drive member for bidirectionaly rotating the drive member.

* * * * *